United States Patent
Uchimura et al.

(10) Patent No.: US 11,579,296 B2
(45) Date of Patent: Feb. 14, 2023

(54) SPATIAL RECOGNITION DEVICE, SPATIAL RECOGNITION METHOD, AND PROGRAM

(71) Applicant: NEC CORPORATION, Tokyo (JP)

(72) Inventors: Jun Uchimura, Tokyo (JP); Hiroshi Takahashi, Kanagawa (JP); Masato Watanabe, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 431 days.

(21) Appl. No.: 16/643,987

(22) PCT Filed: Aug. 15, 2018

(86) PCT No.: PCT/JP2018/030359
§ 371 (c)(1),
(2) Date: Mar. 3, 2020

(87) PCT Pub. No.: WO2019/049624
PCT Pub. Date: Mar. 14, 2019

(65) Prior Publication Data
US 2021/0063574 A1 Mar. 4, 2021

(30) Foreign Application Priority Data
Sep. 5, 2017 (JP) ............................. JP2017-170377

(51) Int. Cl.
*G06F 11/30* (2006.01)
*G01S 17/58* (2006.01)
*G01S 7/48* (2006.01)

(52) U.S. Cl.
CPC ............ *G01S 17/58* (2013.01); *G01S 7/4802* (2013.01)

(58) Field of Classification Search
CPC ....................................................... G01S 17/58
See application file for complete search history.

(56) References Cited

U.S. PATENT DOCUMENTS

2014/0091140 A1\* 4/2014 Hieronimi .............. G06K 7/146
235/375

FOREIGN PATENT DOCUMENTS

| JP | S61-117409 A | 6/1986 |
| JP | 7-152434 A | 6/1995 |
| JP | 11-166831 A | 6/1999 |
| JP | 2002-188918 A | 7/2002 |
| JP | 2002-244733 A | 8/2002 |
| JP | 200-5274232 | \* 10/2005 |
| JP | 2005-274232 A | 10/2005 |

(Continued)

OTHER PUBLICATIONS

Japanese Office Action for JP Application No. 2017-170377 dated Oct. 26, 2021 with English Translation.

(Continued)

*Primary Examiner* — Phuong Huynh
(74) *Attorney, Agent, or Firm* — Sughrue Mion, PLLC (57) ABSTRACT

A spatial recognition device provided with an analysis unit configured to acquire, from an optical device which receives reflected light obtained by radiating light onto a reflective plate provided on a moving body positioned within a detection area, reflected light information obtained based on the reflected light in accordance with a radiation direction of the light, and analyze a state of the moving body on which the reflective plate is provided, based on a distribution of the reflected light information at coordinates within the detection area.

8 Claims, 7 Drawing Sheets

(56) References Cited

FOREIGN PATENT DOCUMENTS

| | | | |
|---|---|---|---|
| JP | 2007-257226 A | | 10/2007 |
| JP | 2013-72858 | * | 4/2013 |
| JP | 2013-072858 A | | 4/2013 |
| JP | 2014-517272 A | | 7/2014 |
| JP | 2017-39188 | * | 2/2017 |
| JP | 2017-039188 A | | 2/2017 |
| WO | 2017/022657 A1 | | 2/2017 |
| WO | 2017/094350 A1 | | 6/2017 |

OTHER PUBLICATIONS

International Search Report for PCT/JP2018/030359 dated Sep. 18, 2018 [PCT/ISA/210].
Japanese Office Communication for JP Application No. 2017-170377 dated May 24, 2022 with English Translation.

* cited by examiner

FIG. 9

SPATIAL RECOGNITION DEVICE, SPATIAL RECOGNITION METHOD, AND PROGRAM

CROSS REFERENCE TO RELATED APPLICATIONS

This application is a National Stage of International Application No. PCT/JP2018/030359 filed Aug. 15, 2018, claiming priority based on Japanese Patent Application No. 2017-170377 filed Sep. 5, 2017.

TECHNICAL FIELD

The present invention relates to a spatial recognition device, a spatial recognition method, and a program.

BACKGROUND ART

Technologies for radiating light and analyzing the reflected light in order to recognize the positions of moving bodies that move within a certain space are disclosed in Patent Document 1 and Patent Document 2.

CITATION LIST

Patent Literature

[Patent Document 1]
Japanese Unexamined Patent Application, First Publication No. 7-152434
[Patent Document 2]
Japanese Unexamined Patent Application, First Publication No. 2002-188918

SUMMARY OF INVENTION

Problem to be Solved by the Invention

In spaces in which various objects are placed and many stationary structures are arranged in the same pattern, there is a need for a technology that can easily, at low cost, recognize the positions of moving bodies such as transport apparatuses or objects being carried by those transport apparatuses, and the quality of work based on the movement of those moving bodies.

Thus, an objective of the present invention is to provide a spatial recognition device, a spatial recognition method, and a program that can solve the above-mentioned problem.

Means for Solving the Problem

According to a first embodiment of the present invention, a spatial recognition device includes an analysis unit configured to acquire, from an optical device which receives reflected light obtained by radiating light onto a reflective plate provided on a moving body positioned within a detection area, reflected light information obtained based on the reflected light in accordance with a radiation direction of the light, and analyze a state of the moving body on which the reflective plate is provided, based on a distribution of the reflected light information at coordinates within the detection area.

According to a second embodiment of the present invention, a spatial recognition method includes: acquiring, from an optical device which receives reflected light obtained by radiating light onto a reflective plate provided on a moving body positioned within a detection area, reflected light information obtained based on the reflected light in accordance with a radiation direction of the light; and analyzing a state of the moving body on which the reflective plate is provided, based on a distribution of the reflected light information at coordinates within the detection area.

According to a third embodiment of the present invention, a program causes a computer in a spatial recognition device to execute processes, the processes including: acquiring, from an optical device which receives reflected light obtained by radiating light onto a reflective plate provided on a moving body positioned within a detection area, reflected light information obtained based on the reflected light in accordance with a radiation direction of the light; and analyzing a state of the moving body on which the reflective plate is provided, based on a distribution of the reflected light information at coordinates within the detection area.

Advantageous Effects of Invention

According to the present invention, in a space in which various objects are placed and many stationary structures are arranged in the same pattern, it is possible easily recognize, at low cost, the positions of moving bodies such as transport apparatuses and objects being carried by those transport apparatuses, and the quality of work based on the movement of those moving bodies.

DESCRIPTION OF EMBODIMENTS

Hereinafter, a spatial recognition device according to an embodiment of the present invention will be explained with reference to the drawings.

Figure 1:
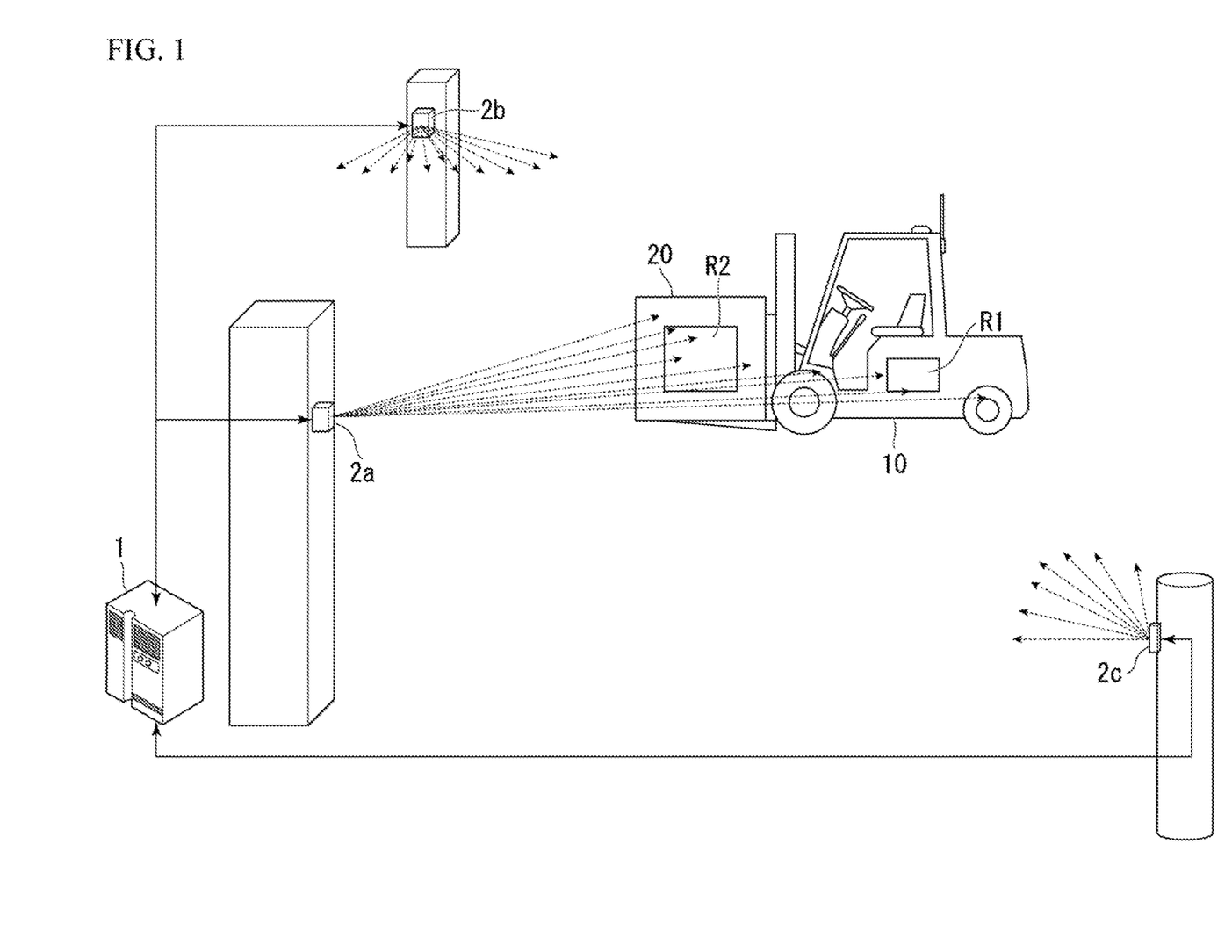
FIG. 1 is a diagram schematically illustrating a spatial recognition system according to an embodiment of the present invention.

FIG. 1 is a diagram schematically illustrating a spatial recognition system including a forklift provided with a spatial recognition device according to the same embodiment.

The forklift 10 illustrated in FIG. 1 is an example of a moving body that moves within a space in which various objects are placed and many stationary structures are arranged in the same pattern. The forklift 10 carries freight, such as a container 20, that is to be placed in the space, through which the forklift 10 can move. The forklift 10 is provided with a reflective plate R1. Additionally, the freight such as a container 20 being carried by the forklift 10 is provided with a reflective plate R2. The reflective plate R1, the reflective plate R2, . . . will be referred to collectively as reflective plates R. When the forklift 10 is carrying multiple containers 20 at the same time, reflective plates R may be provided on each of the multiple containers 20.

The stationary structures arranged in the space are, for example, columns, walls and the like. As illustrated in FIG. 1, in the spatial recognition system 100, radar devices 2 are provided, in one example, on square or circular columns. As the radar devices 2, the radar devices of radar devices 2a, 2b and 2c are illustrated. The radar devices 2a, 2b and 2c will be referred to collectively as radar devices 2 in FIG. 1. The radar devices 2 may be mounted on multiple stationary structures, such as multiple columns and walls. The radar devices 2 are communicably connected to the spatial recognition device 1 through a communication network. The radar devices 2 radiate light within the space based on control by the spatial recognition device 1, and receive reflected light that is reflected at reflection positions of that light. The radar devices 2, for example, are each provided with a sensor, and output the intensity (received light intensity) of the reflected light received by a light-receiving element in the sensor. The received light intensity of the reflected light reflected by the reflective plates R and received by the radar devices 2 is stronger than the received light intensity of reflected light reflected at positions other than the reflective plates R and received by the radar devices 2.

The radar devices 2 radiate light onto respective reflection positions corresponding to the respective pixels in finely divided image surfaces of the detection areas. The radar devices 2 output, to the spatial recognition device 1, information regarding received light intensities and ranges obtained from the reflected light obtained when the radiated light is reflected at the reflection positions. The spatial recognition device 1 acquires, from the radar devices 2, the information regarding the received light intensities, ranges and the like obtained from the reflected light in accordance with the reflection positions of the light. The spatial recognition device 1 analyzes the positions and states of the forklift 10 and the container 20 on which the reflective plates R are provided. The spatial recognition device 1 may analyze identification information of the forklift 10 and the container 20 on which the reflective plates R are provided on the basis of the distributions of reflective areas provided on the reflective plates R. Additionally, the spatial recognition device 1 may analyze identification information of the forklift 10 and the container 20 on which the reflective plates R are provided on the basis of the distribution of recesses and protrusions provided on the reflective plates R.

Figure 2:
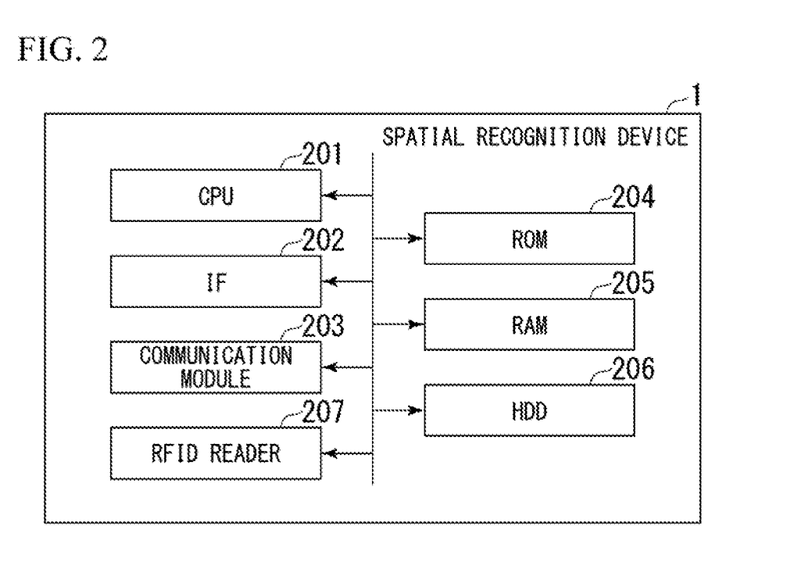
FIG. 2 is a diagram illustrating the hardware structure of a spatial recognition device according to an embodiment of the present invention.

FIG. 2 is a diagram illustrating the hardware structure of the spatial recognition device 1 according to the same embodiment.

The spatial recognition device 1 is provided with features such as a CPU (Central Processing Unit) 201, an IF (Interface) 202, a communication module 203, a ROM (Read-Only Memory) 204, a RAM (Random Access Memory) 205, an HDD (Hard Disk Drive) 206, an RFID reader 207, and the like. The communication module 203 communicates with the spatial recognition device 1. The IF 202 is, for example, an interface for accessing an operating terminal 3 communicably connected to the spatial recognition device 1. The RFID reader 207, for example, reads an RFID tag provided on the placed container 20 or the like, and acquires information such as a freight ID.

Figure 3:
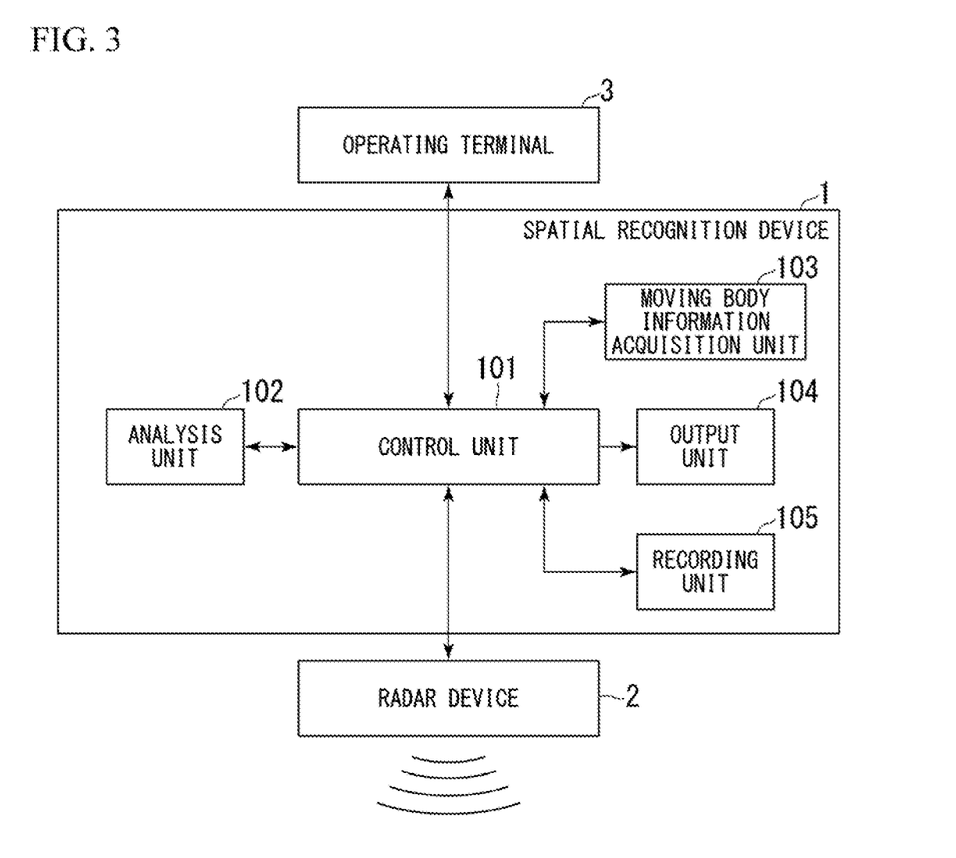
FIG. 3 is a diagram illustrating functional blocks in a spatial recognition device according to an embodiment of the present invention.

FIG. 3 is a diagram illustrating functional blocks in the spatial recognition device 1 according to the same embodiment.

The spatial recognition device 1 is provided with functional units including a control unit 101, an analysis unit 102, a moving body information acquisition unit 103, an output unit 104 and a recording unit 105.

The control unit 101 controls the functions provided in the spatial recognition device 1.

The radar device 2 radiates light onto the reflective plates R provided on moving bodies such as the forklift 10 and the container 20 positioned within the detection area and receives the reflected light from the radiated light. The analysis unit 102 acquires, from the radar device 2, information obtained based on the reflected light in accordance with the radiation direction of the light. The analysis unit 102 analyzes the positions or states of the moving bodies such as the forklift 10 and the container 20 on which the reflective plates R are provided, on the basis of distributions of information obtained based on the reflected light at each coordinate within the detection area of the radar device 2. The information distribution is, for example, a distribution of values indicating received light intensities and ranges obtained from the reflected light.

The moving body information acquisition unit 103 acquires information such as a moving body ID (identification) of the forklift 10 or the container 20 detected as a result of analysis by the spatial recognition device 1.

The output unit 104 outputs display information, such as warning information or moving body position information, on a monitor or the like provided on the operating terminal 3.

The recording unit 105 records information such as the analysis results from the analysis unit 102 in a storage device such as the ROM 204 or the RAM 205.

Figure 4:
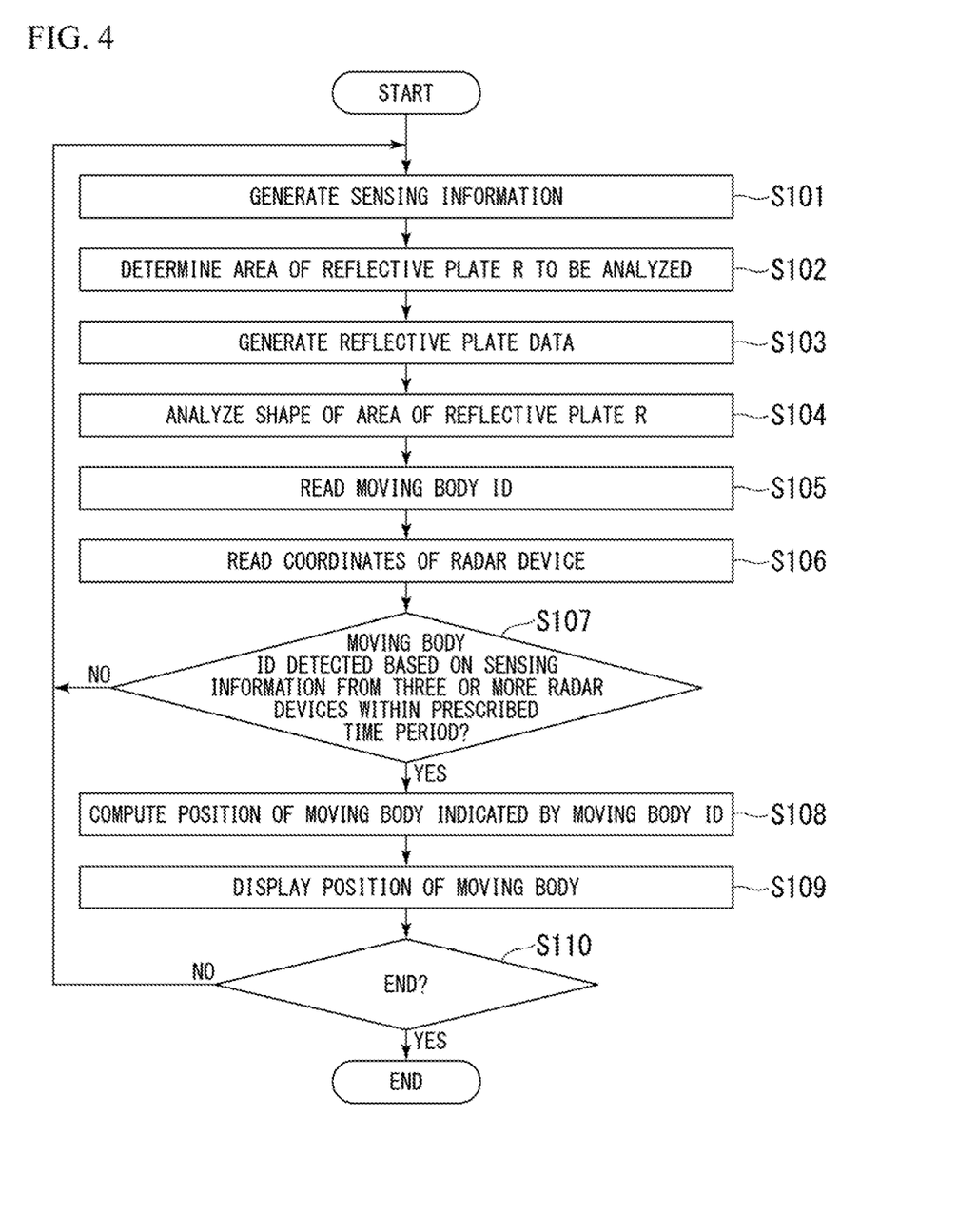
FIG. 4 is a diagram illustrating the processing flow in a spatial recognition device according to an embodiment of the present invention.

FIG. 4 is a diagram illustrating the processing flow in the spatial recognition device 1.

Next, the processing flow in the spatial recognition device 1 will be explained by following the sequence.

A manager operates the operating terminal 3 and activates the spatial recognition device 1. As a result thereof, the control unit 101 of the spatial recognition device 1 instructs the radar device 2 to start processing. The radar device 2 radiates light in each direction in the detection area of that device, and receives reflected light reflected at reflection positions. The radar device 2, as one example, may detect the intensity of the reflected light reflected by the objects located within the detection area for each direction in which the light is radiated. The radar device 2 outputs, to the spatial recognition device 1, the intensity of the reflected light due to the light radiated in each direction in the detection area, for each prescribed interval of one second, several milliseconds, or the like. The forklift 10 moves, thereby varying the detection area of the radar device 2. The control unit 101 generates sensing information, including the received light intensities of the reflected light and the ranges to the reflection positions of the reflected light, corresponding to each light radiation direction within the detection area, received from the radar device 2, in each prescribed interval (step S101). The ranges to the reflection positions of the reflected light indicate the ranges from the radar device 2 to the reflection positions. The control unit 101 outputs the generated sensing information to the analysis unit 102. The sensing information includes at least information representing each pixel in a finely divided image surface of the detection area, the reflected light intensity of the reflected light from reflection positions corresponding to those pixels, and the ranges to the reflection positions corresponding to the respective pixels.

Figure 5:
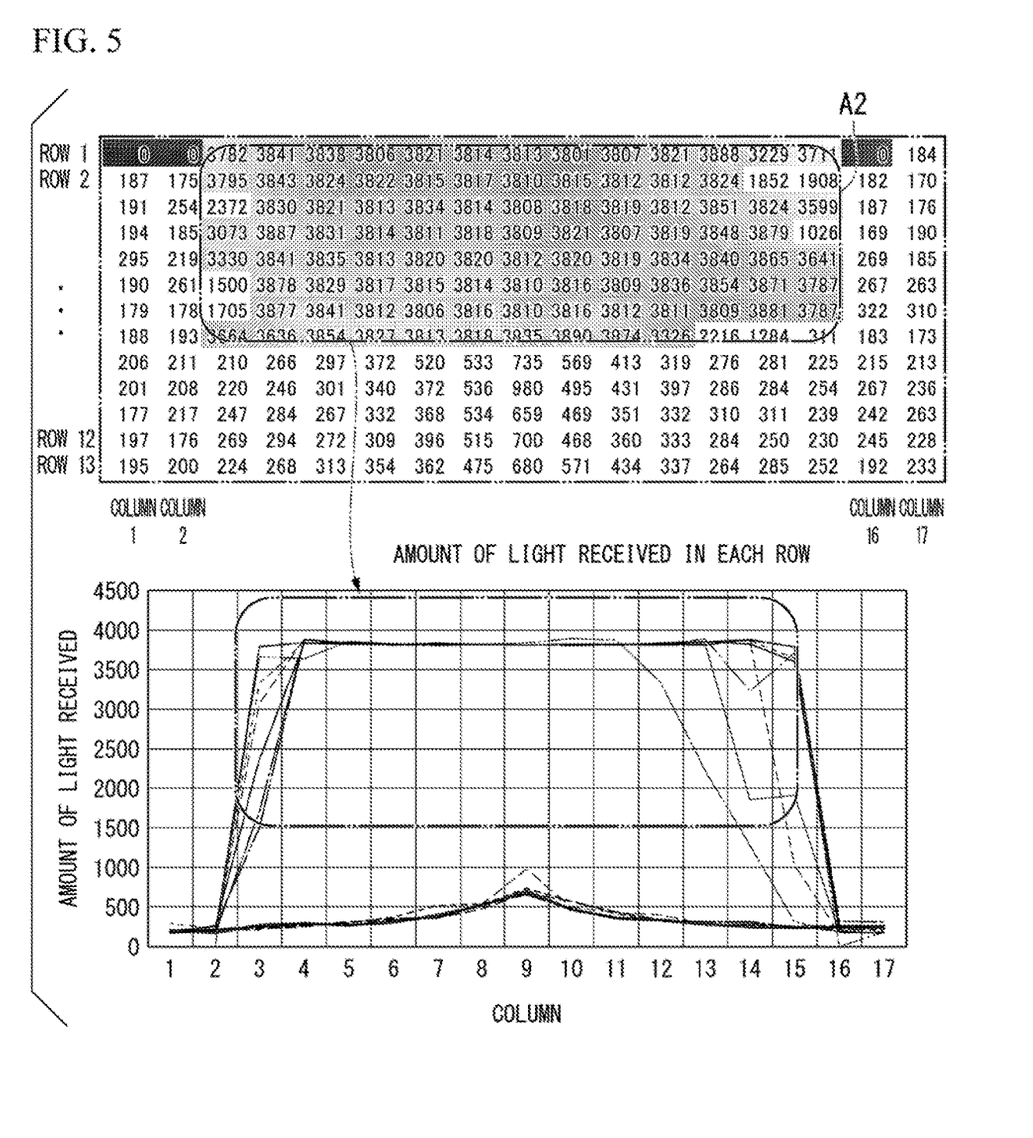
FIG. 5 is a diagram illustrating a specific example of sensing information according to an embodiment of the present invention.

FIG. 5 is a diagram illustrating a specific example of sensing information.

Upon receiving sensing information of the detection area, the analysis unit 102 extracts, from the sensing information, a data group associated with a high-intensity area A2 in which the reflected light intensity (received light intensity), such as the amount of light received, is a prescribed value or higher. The data group associated with the high-intensity area A2, as one example, includes reflected light intensities corresponding to the high-intensity area A2, within the detection area A1, in which the intensity of the reflected light (amount of light received) is high. The data group associated with the high-intensity area A2 shown in FIG. 5 indicates, as one example, the reflected light intensity corresponding to the light radiation direction of each pixel in the high-intensity area A2, among the pixels obtained by dividing the detection area A1 into 13 rows arranged vertically and 17 columns arranged horizontally. The analysis unit 102 sequentially, in the row direction, for the pixels in each row in the data group in the detection area A1, determines whether or not the reflected light intensity is a threshold value or higher, and identifies pixels in which the reflected light intensity is the threshold value or higher. The analysis unit 102 performs the process for identifying pixels in which the reflected light intensity is the threshold value or higher for each row in the detection area A1. The analysis unit 102 determines the area of a pixel group in which the reflected light intensity is the threshold value or higher (high-intensity area A2) as being the area of a reflective plate R that is to be analyzed (step S102). In the example in FIG. 5, the threshold value of the reflected light intensity is, for example, the value "3000".

When the number of pixels, in the row direction and the column direction, in the high-intensity area A2 estimated to correspond to a reflective plate R detected by the analysis unit 102 is less than a prescribed number of pixels, the following determination can be made. Specifically, the analysis unit 102 can determine that the moving body such as the forklift 10 or the container 20 is located at a position far from the reflective plate R such that the area of the reflective plate R detected by the analysis unit 102 is perceived almost as a point. Additionally, when the number of pixels, in the row direction and the column direction, in the high-intensity area A2 estimated to correspond to a reflective plate R detected by the analysis unit 102 is at least a number of pixels covering the entire detection area, the following determination can be made. Specifically, the analysis unit 102 can determine that a moving body such as the forklift or the container 20 on which a reflective plate R is provided is located at a very close position. As one example, when the pixel groups of areas estimated to be reflective plates R are composed of such a small number of pixels as to be perceived as points, the analysis unit can estimate that the moving bodies are located far away, so the areas estimated to be the reflective plates R can be excluded from the analysis targets. The analysis unit 102 generates reflective plate data including the pixel numbers of pixels within the high-intensity area A2 determined as corresponding to the area of a reflective plate R to be analyzed, and the reflected light intensity at each pixel and the range to the reflection position indicated by each pixel (step S103).

When reflective plate data has been generated on the basis of the sensing information, the analysis unit 102 analyzes the shape of the area of the reflective plate R indicated by the reflective plate data by means of pattern recognition (step S104). The analysis unit 102 outputs a shape ID indicating the recognized shape of the reflective plate R to the moving body information acquisition unit 103. The moving body information acquisition unit 103 reads moving body IDs recorded in a storage unit such as an HDD 206 in association with shape IDs indicating shapes (step S105). It is assumed that just one moving body ID is recorded in the HDD 206 in association with the shape of a specific reflective plate R. The moving body ID may, for example, be the ID of the forklift 10 or the ID of the container 20.

The analysis unit 102 identifies sensing information corresponding to each set of reflective plate data by which the same moving body ID was detected, and identifies the radar devices 2 that transmitted that sensing information. For example, the case in which the same moving body ID has been detected, within a duration that can be estimated to be the same time, on the basis of reflective plate data generated from sensing information output from each of the radar devices 2a, 2b and 2c as illustrated in FIG. 1 will be explained. In this case, the analysis unit 102 reads the coordinates of the radar devices 2a, 2b and 2c from the HDD 206 (step S106). The analysis unit 102 determines whether or not the moving body ID read in step S105 was able to be detected based on reflective plate data generated on the basis of sensing information from each of three or more radar devices 2, the sensing information having been obtained within a prescribed time period (step S107). When the determination in step S107 results in a YES, the analysis unit 102 acquires the range to a pixel in the central portion of the area of the reflective plate R obtained from each set of the reflective plate data. Then, the analysis unit 102 computes the position of the moving body indicated by that moving body ID (step S108). On the other hand, if the determination in step S107 results in a NO, the process returns to step S101, and the process is repeated from the generation of the next sensing information based on signals received from the radar devices 2.

The computation process (S108) for the position (coordinates) of the moving body indicated by the moving body ID, performed by the analysis unit 102, will be explained.

Figure 6:
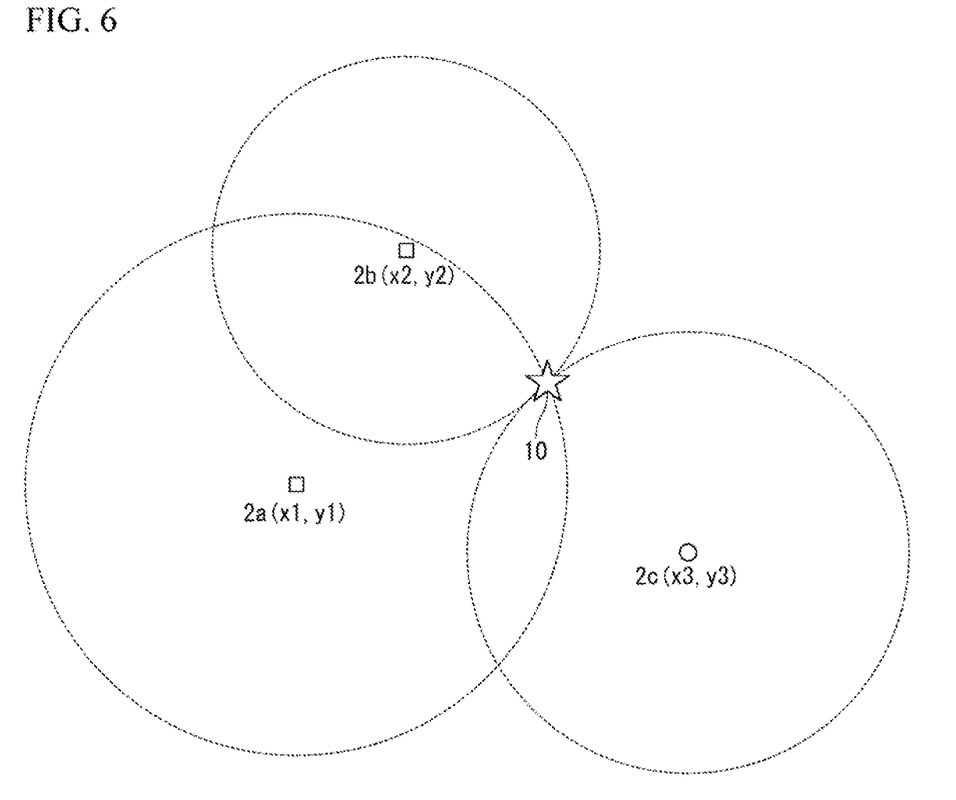
FIG. 6 is a diagram schematically illustrating the computation of the coordinates of a moving body according to an embodiment of the present invention.

FIG. 6 is a diagram schematically illustrating the computation process for the coordinates of the moving body.

Upon acquiring the position of each of the multiple radar devices 2 and the range from each radar device 2 to the central portion of the reflective plate R, the analysis unit 102 computes the position of the moving body based on that information.

For example, the analysis unit 102 computes the intersection of three circles drawn based on the position of each of the three radar devices 2a, 2b and 2c, and the ranges from the respective radar devices 2a, 2b and 2c to the central portion of the reflective plate R. The first circle is a circle centered at the coordinates (x1, y2) of the radar device 2a and having a radius equal to the range L1 from that radar device 2a to the central portion of the reflective plate R on the forklift 10. The second circle is a circle centered at the coordinates (x2, y2) of the radar device 2b and having a radius equal to the range L2 from that radar device 2b to the central portion of the reflective plate R on the forklift 10. The third circle is a circle centered at the coordinates (x3, y3) of the radar device 2c and having a radius equal to the range L3 from that radar device 2c to the central portion of the reflective plate R on the forklift 10. The analysis unit 102 identifies the intersection of the three circles as the coordinates of the forklift 10 indicated by the moving body ID read in step S105. In a manner similar to the computation process for the coordinates of the forklift 10, the analysis unit 102 computes, for example, the coordinates of the container 20 loaded onto the forklift 10.

The output unit 104 outputs the positions of the moving bodies, such as the forklift 10 and the container 20 computed by the analysis unit 102, and moving body IDs thereof onto a spatial map displayed on the output unit 104 of the operating terminal 3 (step S109). The output unit 104 may read moving body names from the HD 206 based on the moving body IDs and output those moving body names, together with the moving body IDs, on the spatial map. Additionally, if a moving body is the container 20 based on the moving body ID thereof, the output unit 104 may read, from the HDD 206, information such as a product name, a product ID, a quantity and the like of the product contained in the container 20, and output this information on the spatial map. As a result thereof, the manager is able to see the positions of the moving bodies in space, as well as other attribute information and the like. The control unit 101 determines whether or not the processing is to be ended (step S110). If the processing is not to be ended (NO in step S110), the control unit 101 implements control to repeat the process from step S101. On the other hand, if the processing is to be ended (YES in step S110), the control unit 101 ends the processing flow shown in FIG. 4.

The analysis unit 102 can detect shifts in the positions of the moving bodies by repeating the above-mentioned position detection processes for each of the moving body IDs. As a result thereof, the analysis unit 102 is able to analyze the movement trajectory of the forklift 10, the movement trajectory of the container 20 and the like. A movement trajectory is information represented by the location, in three-dimensional space, at each of times separated by prescribed intervals, of each moving body such as the forklift 10 and the container 20. The analysis unit 102 may analyze whether or not the trajectories of the moving bodies are following prescribed patterns or whether or not the speeds thereof are prescribed speeds, and determine whether or not the movement states are satisfactory. For example, if the analysis unit 102 determines that the trajectory of a moving body has deviated from a prescribed pattern, information indicating that the movement state of the moving body is poor is recorded in the HDD 206 or the like in association with the moving body ID. Additionally, the analysis unit 102 may analyze the information to determine whether work was performed carefully or safely based on the trajectory of the raising and lowering positions of a container 20, and may record the analysis results thereof in association with the moving body ID.

Thus, for example, the moving body may be freight such as a container 20. The analysis unit 102 analyses the position of the freight based on the area of a reflective plate R, and analyzes the state relating to the quality of the freight movement work based on the history of the freight position.

The reflective plates R may be mounted on the stationary structures. For example, by mounting them on structural units, the analysis unit 102 may analyze the tilting and movement of that structure over time. In such a case, the stationary structure can be considered to be a form of moving body. For example, when a reflective plate R is mounted on a stationary structure such as a shelf, the analysis unit 102 may monitor whether the shelf has fallen over based on shifts in the position of a reflective plate R provided on that shelf.

By means of the above-described process, the spatial recognition device 1 is able to easily recognize the positions of moving bodies that move in a space in which many stationary structures are arranged in the same pattern and various objects are placed. Additionally, the spatial recognition device 1 does not need to be provided with a device for identifying the positions of moving bodies by analyzing signals emitted from position information emitting tags, or with a device for identifying the positions of moving bodies by analyzing the positions by means of a GNSS (Global Navigation Satellite System) or the like. That is, the spatial recognition device 1 only requires reflective plates R to be provided on moving bodies R. For this reason, it is possible to reduce the cost of the devices constituting the system. Additionally, the spatial recognition device 1 uses light to measure the positions of the moving bodies, and does not use radio waves, which may affect electronic circuits. For this reason, the invention is useful for recognizing the positions of moving bodies in areas in which the emission of radio signals is restricted.

In the above-described process, the analysis unit 102 determines whether or not areas correspond to reflective plates R based on a range where the reflected light intensity in that area is a threshold value or higher. However, the analysis unit 102 may further determine the areas corresponding to reflective plates R based on the difference in the reflected light intensity between pixel areas in which the reflected light intensity is the threshold value or higher, and pixels that are adjacent to those pixel areas and that have reflected light intensities lower than the threshold value. In other words, the analysis unit 102 may identify pixel areas in which the reflected light intensity is the threshold value or higher as being areas corresponding to reflective plates R to be analyzed only when the difference is a prescribed threshold value or higher.

Figure 7:
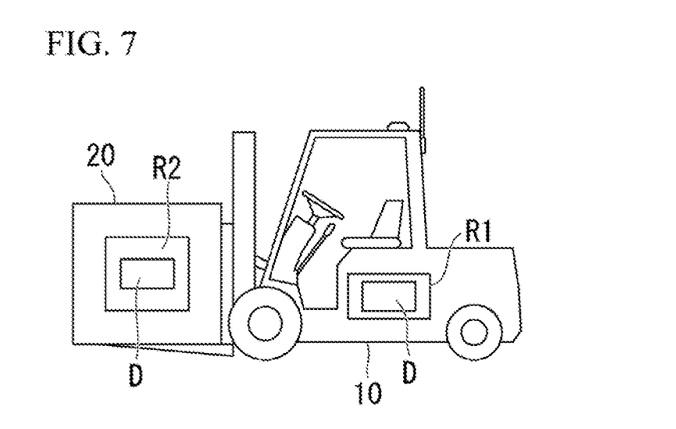
FIG. 7 is a diagram illustrating a first modified example of a reflective plate according to an embodiment of the present invention.

FIG. 7 is a diagram illustrating a first modified example of a reflective plate R.

The reflective plate R1 provided on the container 20 and the reflective plate R2 provided on the forklift 10 may have two-dimensional code information D, such as QR codes (registered trademark), printed thereon. In this case, the analysis unit 102 acquires a binary image in which, within a high-intensity area A2 that has been determined as being an area corresponding to a reflective plate R, pixels are assigned two values associated with pixels for which the reflected light intensity is less than the threshold value and pixels for which the reflected light intensity is the threshold value or higher. In this case, for example, the threshold value used for acquiring the binary image is greater than the threshold value when determining the high-intensity areas A2. Alternatively, the analysis unit 102 may determine that regions surrounded by pixels in which the reflected light intensity is a threshold value or higher as high-intensity areas A2. The analysis unit 102 determines that the binary image constitutes two-dimensional code information D. Based on the binary image within the high-intensity area A2, the analysis unit 102 may read the moving body ID indicated by the reflective plate R by means of a conventional method for analyzing two-dimensional code information D. Thus, the analysis unit 102 may analyze identification information for moving bodies based on the distributions (two-dimensional code information D) in reflective regions provided in reflective plates R acquired on the basis of reflected light intensities at coordinates within the areas corresponding to the reflective plates R.

Figure 8:
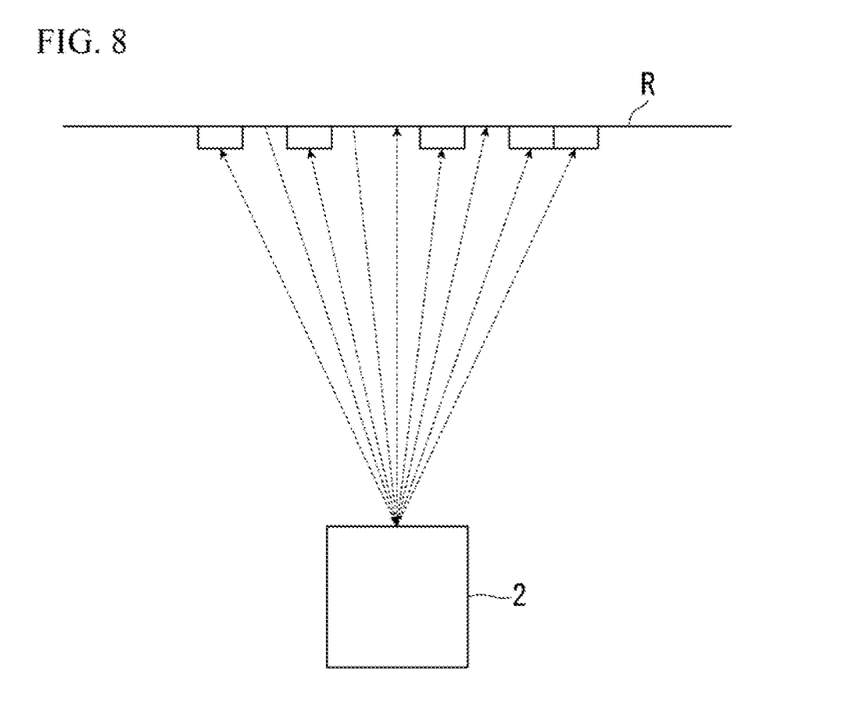
FIG. 8 is a diagram illustrating a second modified example of a reflective plate according to an embodiment of the present invention.

FIG. 8 is a diagram illustrating a second modified example of a reflective plate R.

The reflective plate R may be provided with recesses and protrusions as shown in FIG. 8. In this case, the analysis unit 102 computes the range to the reflection position corresponding to each of the pixels in the high-intensity area A2 determined to be the area of a reflective plate R. The analysis unit 102, for example, computes the range from the radar device 2 to the reflection position corresponding to each of the pixels in the high-intensity area A2 on the basis of the time elapsed from the light radiation time to the light reception time. Based on the computed ranges, the analysis unit 102 detects pixels in which the difference in the range relative to adjacent pixels is large and pixels in which the difference in the range relative to adjacent pixels is small. The analysis unit 102 acquires a binary image obtained by binarizing each pixel based on determining whether the range between adjacent pixels is large or small, and determines that the binary image constitutes two-dimensional code information D. Based on the binary image within the high-intensity area A2, the analysis unit 102 may read the moving body ID indicated by the reflective plate R by means of conventional methods for analyzing two-dimensional code information D.

In this way, the distribution of reflected light information may be a distribution of the range from the radiation point to the reflection point in real space corresponding to each coordinate, based on the time elapsed from the light radiation time to the reflected light reception time. The analysis unit 102 analyzes, as the states of the moving bodies, the positions of the moving bodies based on the distribution of the ranges. Additionally, the analysis unit 102 may further analyze moving body identification information based on the distribution of recesses and protrusions provided on reflective plates R acquired on the basis of the range distribution.

Figure 9:
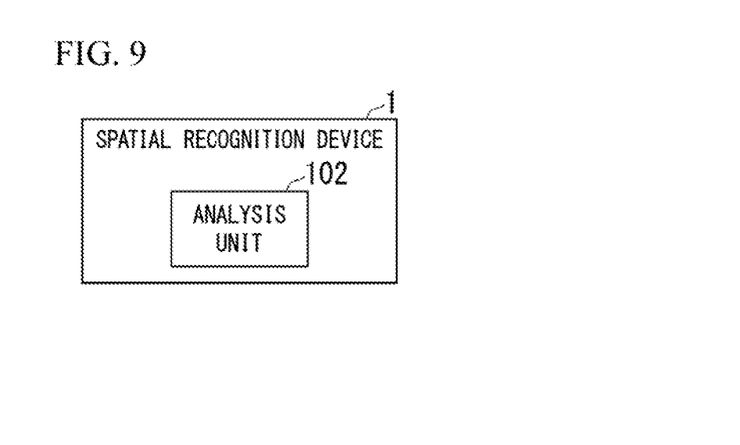
FIG. 9 is a diagram illustrating the minimum structure of a spatial recognition device according to an embodiment of the present invention.

FIG. 9 is a diagram illustrating the minimum structure of the spatial recognition device 1.

The spatial recognition device 1 illustrated in FIG. 9 only needs to be provided with at least an analysis unit 102.

An optical device receives reflected light obtained by radiating light onto reflective plates provided on moving bodies positioned in a detection area. The analysis unit 102 acquires, from the optical device, reflected light information obtained from the reflected light in accordance with the light radiation direction. The analysis unit 102 determines at least the positions of moving bodies on which the reflective plates are provided, based on the distribution of reflected light information obtained at each coordinate in the detection area.

The above-mentioned spatial recognition device has a computer system in the interior thereof. Furthermore, the steps in the above-described processes are stored on a computer-readable recording medium in the form of a program, and the above-described processes are performed by the computer reading and executing this program. In this case, computer-readable recording media refer to magnetic disks, magneto-optic disks, CD-ROMs, DVD-ROMs, semiconductor memory devices and the like. Additionally, this computer program may be distributed to a computer by means of communication lines, and the program may be executed by the computer receiving the distributed program.

Additionally, the above-mentioned program may be for realizing some of the aforementioned functions.

Furthermore, the aforementioned functions may be implemented by a so-called difference file (difference program) that can be realized by being combined with a program that is already recorded on a computer system.

Priority is claimed on Japanese Patent Application No. 2017-170377, filed Sep. 5, 2017, the entire disclosure of which is incorporated herein by reference.

INDUSTRIAL APPLICABILITY

According to the present invention, in a space in which various objects are placed and many stationary structures are arranged in the same pattern, it is possible easily recognize, at low cost, the positions of moving bodies such as transport apparatuses and objects being carried by those transport apparatuses, and the quality of work based on the movement of those moving bodies.

REFERENCE SIGNS LIST

1 Spatial recognition device
2 Radar device
3 Operating terminal
10 Forklift
20 Container
101 Control unit
102 Analysis unit
103 Vehicle information acquisition unit
104 Output unit
105 Recording unit

The invention claimed is:

1. A spatial recognition device comprising:
an analysis unit configured to:
acquire, from an optical device which receives reflected light obtained by radiating light onto a reflective plate provided on a moving body positioned within a detection area, reflected light information obtained based on the reflected light in accordance with a radiation direction of the light, and
analyze a state of the moving body on which the reflective plate is provided, based on a distribution of the reflected light information at coordinates within the detection area,
wherein a two-dimensional code is provided on the reflective plate, and
wherein the analysis unit acquires a binary image based on a result of comparing an intensity of the reflected light included in the reflected light information, obtained by radiating the light onto the reflective plate on which the two-dimensional code is provided, with an intensity threshold value, and analyzes identification information of the moving body based on the acquired binary image indicating the two-dimensional code.

2. The spatial recognition device according to claim 1, wherein:
the distribution of the reflected light information is a distribution, within the detection area, in a reflective area in which the intensity of the reflected light included in the reflected light information exceeds the intensity threshold value; and
the analysis unit analyzes, as the state of the moving body, a position of the moving body, based on the distribution in the reflective area.

3. The spatial recognition device according to claim 1, wherein:
the distribution of the reflected light information is a distribution of ranges from a radiation point to reflection points, in real space, corresponding to the coordinates, based on time elapsed from radiation times of the light to reception times of the reflected light; and the analysis unit analyzes, as the state of the moving body, a position of the moving body, based on the distribution of the ranges.

4. The spatial recognition device according to claim 2, wherein:

the analysis unit further analyzes the identification information of the moving body based on a distribution in a reflective region provided on the reflective plate acquired based on intensities of the reflected light at the coordinates in the reflective area.

5. The spatial recognition device according to claim 3, wherein:

the analysis unit further analyzes the identification information of the moving body based on a distribution of recesses and protrusions provided on the reflective plate acquired based on the distribution of the ranges.

6. The spatial recognition device according to claim 1, wherein:

the moving body is freight; and the analysis unit analyzes a position of the freight based on the distribution in the reflective area, and analyzes the state, which relates to a quality of movement work of the freight, based on a history of the position of the freight that is analyzed.

7. A spatial recognition method comprising:

acquiring, from an optical device which receives reflected light obtained by radiating light onto a reflective plate provided on a moving body positioned within a detection area, reflected light information obtained based on the reflected light in accordance with a radiation direction of the light; and analyzing a state of the moving body on which the reflective plate is provided, based on a distribution of the reflected light information at coordinates within the detection area, wherein a two-dimensional code is provided on the reflective plate, wherein the acquiring of the reflected light information includes acquiring a binary image based on a result of comparing an intensity of the reflected light included in the reflected light information, obtained by radiating the light onto the reflective plate on which the two-dimensional code is provided, with an intensity threshold value, and wherein the analyzing of the state of the moving body includes analyzing identification information of the moving body based on the acquired binary image indicating the two-dimensional code.

8. A non-transitory computer-readable recording medium storing a program that causes a computer in a spatial recognition device to execute processes, the processes comprising:

acquiring, from an optical device which receives reflected light obtained by radiating light onto a reflective plate provided on a moving body positioned within a detection area, reflected light information obtained based on the reflected light in accordance with a radiation direction of the light; and analyzing a state of the moving body on which the reflective plate is provided, based on a distribution of the reflected light information at coordinates within the detection area, wherein a two-dimensional code is provided on the reflective plate, wherein the acquiring of the reflected light information includes acquiring a binary image based on a result of comparing an intensity of the reflected light included in the reflected light information, obtained by radiating the light onto the reflective plate on which the two-dimensional code is provided, with an intensity threshold value, and wherein the analyzing of the state of the moving body includes analyzing identification information of the moving body based on the acquired binary image indicating the two-dimensional code.

* * * * *